United States Patent

[11] 3,619,746

| [72] | Inventors | Richard D. Thornton<br>Concord;<br>William S. Brown, Cambridge, both of Mass. |
|---|---|---|
| [21] | Appl. No. | 844,947 |
| [22] | Filed | July 25, 1969 |
| [45] | Patented | Nov. 9, 1971 |
| [73] | Assignee | Massachusetts Institute of Technology<br>Cambridge, Mass. |

[54] ELECTRONIC COMMUTATION SYSTEM FOR MOTORS
16 Claims, 6 Drawing Figs.

[52] U.S. Cl........................................... 318/138,
318/254, 318/439
[51] Int. Cl................................................ H02k 29/00
[50] Field of Search................................ 318/138,
254, 415, 20.860, 20.917

[56] References Cited
UNITED STATES PATENTS

| 2,814,769 | 11/1957 | Williams........................ | 318/138 X |
| 3,242,405 | 3/1966 | Ikegami......................... | 318/254 X |
| 3,374,410 | 3/1968 | Cronquist et al. ............. | 318/415 X |
| 3,386,019 | 5/1968 | Hill................................. | 318/254 X |
| 3,419,782 | 12/1968 | Sheldrake et al. ............. | 318/254 X |
| 3,488,566 | 1/1970 | Fukuda.......................... | 318/138 |

*Primary Examiner*—G. R. Simmons
*Attorneys*—Thomas Cooch, Martin M. Santa and Robert Shaw ABSTRACT: An electronic motor to connect to a DC power source and to provide a variable speed or a controllable fixed speed motor. There is disclosed a novel arrangement for effecting commutation of current in the armature windings of the motor. Commutation is initiated by signals from a variable frequency generator or from a position sensor. In either case, in the described embodiment, commutation is effected by silicon-controlled rectifiers, diodes, a transformer and drive circuitry therefor, the rectifiers being connected serially in pairs to the motor armature such that current is introduced to the armature winding through a rectifier of one pair and removed therefrom through a rectifier of another pair, the two current-carrying rectifiers changing with each commutation and the transformer being in part connected to the rectifiers such that during commutation a commutating voltage from the transformer is introduced through four rectifiers to the two armature coils undergoing commutation.

INVENTORS:
RICHARD D. THORNTON
WILLIAM S. BROWN
BY
ATTORNEY

ELECTRONIC COMMUTATION SYSTEM FOR MOTORS

The invention herein described was made during a contract with the Department of Transportation.

The present invention relates to electronic motors and, particularly, to motors adapted to provide controllable variable speed but which, in particular circumstances, can be operated at a controllable single speed. An electronic motor, as the term is used herein, denotes an electromechanical motor structure used in combination with one or more electronic devices (such as diodes, SCR's, transistors, integrated circuits, and the like) which make possible a level of motor performance which is higher than and/or differs from levels achievable without such devices.

The subject matter of the present disclosure is contained in a journal article entitled "High-frequency Motors for Electric Propulsion" by Richard D. Thornton (one of the inventors herein) published in the Intersociety Energy Conversion Engineering Conference 1968 Record, and in a thesis dated Feb. 1969, entitled "Electronic Commutation for a Direct-Current Machine" by William S. Brown (the other inventor herein), the thesis having been deposited in the Massachusetts Institute of Technology library system in 1969. The usefulness of electric motors, as noted in both the journal article and the thesis, is often limited by their weight. This is particularly true in conventional DC machines in which mechanical commutation limits the upper electrical frequencies of armature currents, which results in low specific power since there is a relationship between electric frequency of armature excitation and the motor weight. Recently semiconductor controlled rectifiers (SCR) have been used to commutate high-frequency machines. SCR commutation devices do not necessarily depend upon voltages induced in the armature windings by relative motion to effect commutation, and, therefore, can provide far faster commutation than mechanical apparatus; furthermore, SCR's are capable of carrying the high electric currents necessary to drive power machinery. The SCR is a two state device which is easy to turn on but usually difficult to turn off. A principal object of the present invention is to provide a novel means for controlling such SCR's to effect commutation of current in the armature of electronic motors, but one which may be used in connection with other switching devices as well.

Another object is to provide a variable speed electronic motor, the motor being particularly adapted to function at extremely high frequencies of armature current to furnish a motor having a high specific power.

Still another object is to provide an electronic motor particularly adapted for variable speed motor operation, but one adapted to controllable constant speed operation as well.

A further object is to provide an electronic motor that is useful as a vehicle drive means such as may be used, for example, for automobile propulsion.

Other and still further objects are discussed in the description to follow and are particularly delineated in the appended claims.

The objects of the invention are attained in an electronic motor that includes an armature winding having an even number of coils connected in a closed-loop configuration and a even number of switching devices connected to conduct electric current between a power source and the nodes of the armature winding. A field is electromagnetically coupled to the armature. A transformer is connected to introduce commutation voltages to the coils of the armature winding, means being provided to initiate commutation of each winding.

The invention will now be explained with reference to the accompanying drawings in which.

Prior to a detailed discussion of the invention with reference to the drawings, it is in order to discuss the present concept, generally. The apparatus is concerned with novel means to effect commutation of current in the windings of a motor armature in order to produce thereby a moving armature field. The illustrated embodiment relates to circular armature shape, but the concept is useful in connection with linear motor designs, as well. Furthermore, in the illustration the field is the rotating or moving portion of the motor, but the armature can also be made to rotate, or, in particular situation, both the armature and field can be rotatable. Irrespective of the particular form the motor takes there is some requirement for controllable variation of speed. Thus, in vehicle drive applications, the motor speed needed will vary over a wide range; whereas, for some machinery drives in the steel industry, for example, a precise constant speed, once established, is required, but some flexibility is needed because the particular constant speed of the machine in one circumstance may differ from the particular constant speed in another. In the embodiment described herein the armature is on the stator and the field is on the rotor. The field may be of permanent magnet material construction or have external DC excitation or it may contain short circulated windings or combinations thereof, depending on the needs. Of utmost concern here, however, is the capability of commutating the electric current in the armature winding thereby to provide variable speed or controllable fixed speed motors. In the thesis mention is made of a particular motor having a short axial length and large diameter, which is particularly attractive for preset purposes.

The scheme disclosed herein uses low-power circuitry (the order of a few watts or less) to initiate commutation, the actual reversal of electric current in the armature winding being effected by high-power circuitry (the order of kilowatts). By divorcing the initiating circuitry from the high-current armature, it is possible, for example, to provide a wide range of armature frequencies using a variable frequency generator; whereas variable frequency generators to provide the wide range of frequencies with the hundreds of watts and kilowatt outputs needed by conventional motors would not be practically achievable. The variable frequency oscillator may be used to initiate commutation for starting purposes only, a position sensor providing this function in the running mode, or either the oscillator or the position sensor may be used in both the starting and running modes.

Figure 1:
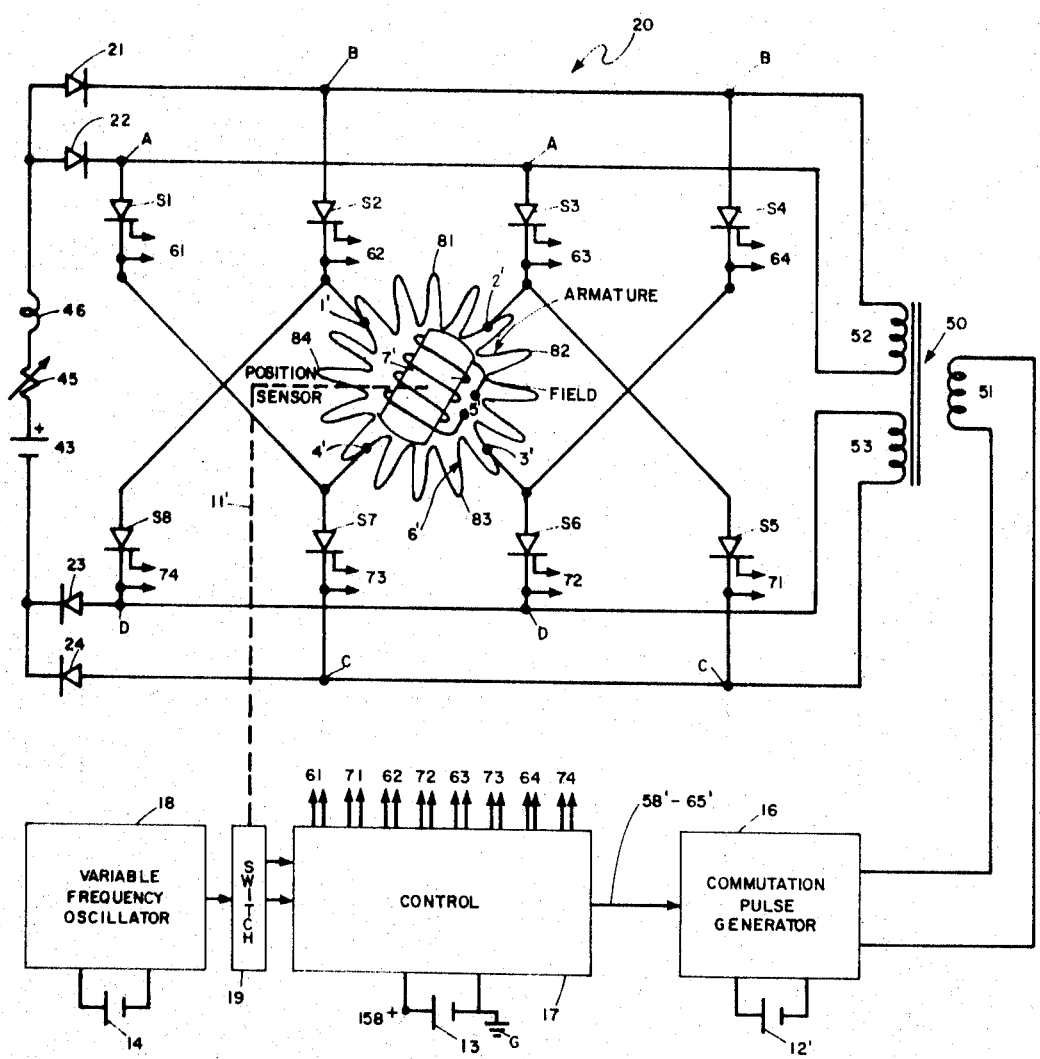
FIG. 1 is a schematic circuit diagram, partially in block diagram form, of apparatus embodying the present inventive concept, a four coil electric motor being shown in the FIG. to simplify the explanation to follow, commutation of electric current in the motor armature occurring at the instance of electric signals from a transformer.

Turning now to FIG. 1, an electronic motor is shown generally at 20. The motor includes an armature winding having an even number of coils connected in a closed-loop configuration. In FIG. 1, to simplify the explanation herein, the armature shown at 6' has four coils 81, 82, 83 and 84, but motors embodying the invention may have any even number of coils in the armature winding and any number of poles on the rotor. In practical motors the armature may have four or more coils and the rotor may have two or more poles; the motor armature show schematically, for example in FIGS. 2 and 4, has 12 windings numbered 30' through 41' and, the rotor for this motor has 40 poles. Switching devices S1 through S8 are connected to conduct electric current between a power source 43 and the nodes of the armature winding designated 1', 2', 3' and 4' in the FIG. A field 7' is electromagnetically coupled to the armature 6', and a position sensor, later described herein, is provided for detecting relative orientation between the magnetic fluxes of the field and the armature to control electric current through the switching devices. A three-winding transformer 50 is connected to introduce commutation voltages through the switching devices S1-S8 to the coils 81-84 of the armature winding in a predetermined sequence. The initiation of commutation of each winding is determined by the position sensor in the normal running mode and in the starting mode commutation is initiated by a variable frequency oscillator 18 which functions as a sweep frequency oscillator for starting.

The electronic motor comprising the armature 6' and the field 7' is a DC motor in which commutation is effected by the use of SCR's or some other semiconductor-switching device. It is started as a synchronous machine, under conditions in which the position sensor is rendered ineffective, and is normally run as a DC machine, under conditions in which the sensor is rendered effective. During starting the synchronous frequency is determined by the variable frequency oscillator 18 functioning as a sweep frequency oscillator, and during normal running the position sensor determines the frequency of electric current direction changes in the armature winding; thus, the motor is run as a variable speed synchronous machine with a fixed torque angle, i.e., a DC machine. In both the starting and running modes, electrical power to the motor comes from the power sources 43 and 12' and commutation is effected upon signals to the transformer 50 from a pulse generator 16 which in turn is controlled by signals from a control 17.

The transformer 50 provides commutating voltages to SCR's S1-S8, as mentioned, and the magnitude of the voltage thereby provided is independent of motor speed, unlike conventional devices which derive a commutation voltage from the armature thereby resulting in a voltage which varies with motor speed. Furthermore, in the apparatus disclosed herein, the time at which the commutating voltage is applied can be arranged to provide optimum results in a particular circumstance. In FIG. 1 the position sensor is shown schematically deriving signals from the field 7', as indicated by the dotted line numbered 11'. The signal thus derived may be a voltage or other signal indicative of rotor position. A more detailed description of a preferred sensor is made hereinafter in connection with FIG. 4. Timing signals from the sensor are fed under the control of a switch 19 to the control 17 and thence to the commutation pulse generator, in a manner later discussed. The control 17 sends signals to the SCR's S1-S4 along conductors 61 to 64 and to the SCR's S5-S8 along conductors 71 to 74, the conductors 61-64 and 71-74 being connected across the gate and cathode of the associated SCR to furnish an input thereto for firing the SCR in response to appropriate signals from the control 17. In FIG. 1 the blocks 19, 17 and 18 are low-power circuits, as the term is defined herein and the remaining circuits are high-power circuits.

The motor, as mentioned, starts as a synchronous machine, the position sensor being rendered ineffective during starting by the switch 19 which disconnects the sensor and simultaneously connects the variable frequency AC source 18 to the control 17 in lieu of the now ineffective sensor to control commutation. At some predetermined speed the position of the switch 19 is changed to reconnect the position sensor to the control and at the same time to disconnect oscillator 18. The switch 19 can be a manual device, or it can be a solenoid-operated switch functioning under the influence of a signal from a tachometer or other speed-determining means, as indicated by the dotted line 11'.

The power source 43 is connected through a variable resistance 45 and an inductance 46 to anode terminals A and B of SCR's S1 and S3 and SCR's S2 and S4, respectively, the return circuits through SCR's S5 and S7 and SCR's S6 and S8 being connected to the cathodes of the SCR's at C and D, respectively. In the embodiment shown in FIG. 2, all terminals A, for example, are connected to a common point, as are, also, the terminals B, C, and D. The resistance 45 may be a rheostat or other apparatus adapted to provide a variable average voltage across the motor terminals as a speed control means, and it can be the speed control used by the operator of a motor vehicle to modify the speed of such vehicle. The inductance 46 serves to keep the current into motor terminals constant during commutation.

The transformer shown in FIG. 1 introduces commutating voltages to both the armature winding and the SCR's S1 to S8 so that commutation of both the SCR's and armature winding need not depend on speed voltages induced in the armature winding. This allows commutations to be performed at arbitrarily low motor speeds. Although the commutation system shown in FIG. 1 can be used at extremely low speeds, it is particularly well suited for high rates of commutation. This system is effective for commutation rates in which the time available for each commutation is comparable to, but longer than, the time needed to commutate the SCR's alone. Commutations can be completed quickly by introducing large commutating voltages through the transformer.

The transformer injected voltages provide an alternative to speed induced voltages for commutation of DC machines, but, in addition, the circuit shown in FIG. 1 can be used to operate synchronous or induction machines with controllable synchronous frequencies. If in FIG. 1 the field winding terminals shown at 5' are shorted and the variable frequency oscillator 18 is used to initiate commutations, the motor operates as an induction machine; if the field winding is excited by a DC source and the position sensor is used to maintain a constant torque angle, the motor operates as a shunt wound DC machine; and if the field winding is excited by a DC source (or a permanent magnet field is used) and the variable frequency oscillator used to initiate commutations, the motor operates as a synchronous machine.

In FIG. 1 the energy associated with the commutation voltage introduced by the transformer comes into the transformer by means of a primary winding 51 and out of the transformer by means of secondary windings 52 and 53. Since the winding 51 can be at a floating potential with respect to windings 52 and 53 and since the turns ratio of the transformer can be varied, there is considerable freedom in the design of the commutation pulse generator. The power for the commutation voltages can come from the main power source 43 or a separate power supply 12', as shown, can be used. Or, since the windings 52 and 53 can be windings of magnetic coupling devices other than transformers, the power for the commutation voltages could come from mechanical motion, and windings 52 and 53 could be parts of rotating machines. A plurality of diodes 21, 22, 23 and 24 is connected between the transformer or magnetic coupling means 50 and the power source 43. The diodes 21 and 22 isolate the terminals A and B from one another and the diodes 23 and 24 isolate the terminal C and C from one another to allow the transformer 50 to maintain a voltage between A and B and between C and D during commutation.

Figure 2:
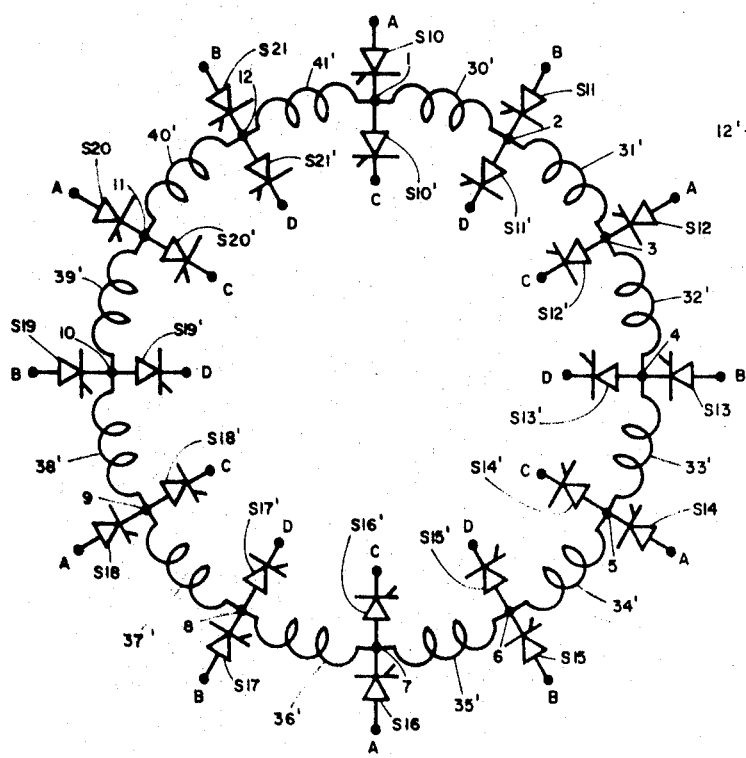
FIG. 2 is a schematic circuit diagram of a twelve coil motor adapted to replace the four coil motor shown in FIG. 1.

Referring now to FIG. 2 the twelve coils in the closed-loop armature winding shown are connected together in such a way that at any time one node (as the node shown at 1, for example) of the loop can be considered the most positive, and the opposite node (as the node shown at 7) the most negative. This potential difference is due to open circuit voltages. The phases of the armature windings are such that opposite coils change open circuit voltage polarity together, and the positions of the most positive and most negative armature nodes move around the armature ring one coil at a time, always staying opposite each other. The motion of most positive and most negative nodes, and also the polarities of the open circuit voltages can be in a clockwise or counterclockwise direction. In the explanation in the following two paragraphs, clockwise rotation is assumed.

The object of commutation is to make motor current enter the most positive armature ring node and leave the least positive ring node. The positive motor current is connected, first to the node 1, then to the node shown at 2, then to the node shown at 3, and so forth. To reverse the motor the sequence is reversed. The positive position moves around the ring $k$ times for each revolution of the machine if the machine has $k$ pairs of field poles. Commutation is accomplished by changing the node where the motor current enters the armature ring, and this is mostly a matter of reversing the current in the armature coil between the two nodes. There is a symmetry in the armature loop shown which makes its operation easier to understand. The positive and negative ends of the circuit are the same, except the directions of the currents, diodes and SCR's are all reversed. A commutation at the positive end is accompanied by a similar commutation at the negative end, so it is necessary only to consider the operation at the positive side of the armature ring.

Commutation will now be explained with reference to the embodiment of FIG. 2 in which the SCR's shown at S10 to S21 are connected to introduce current to nodes 1 to 12, respectively, and the SCR's shown at S10' to S21' are connected to carry current away therefrom. Assume at some particular time the SCR S10 is conducting, and it is time to commutate the coil 30'. After commutation, the SCR S11 will be conducting, and S10 will be off. The SCR S11 is triggered on by a signal from the control 17 applied across the gate and cathode electrodes, in the manner previously discussed in connection with FIG. 1, and a voltage from the transformer secondary 52 is applied between the terminals A and B such that B is more positive than A. Because of the inductance of coil 30', its current does not change instantly, but steadily decreases, goes through zero, and begins to flow from node 2 to node 1. When the current in the coil 30' has completely reversed, the voltage between terminals A and B due to the transformer 50 tries to make current flow backward in the SCR S10 which causes it to turn off. At this time, commutation is essentially complete, although the transformer is still applying a voltage between the terminals A and B, and the transformer core has to reset, as later discussed. Later, when the time comes to commutate the coil 31', the SCR S12 will be triggered by a signal from the control 17 and a voltage from the transformer secondary 52 applied such that the terminal A will be positive with respect to B—just the opposite polarity condition of the previous commutation. The open circuit voltages of the coils being commutated can either speedup or slowdown commutation. In the present system coils are commutated only when their open circuit voltages are low and this effect is ignored in the present explanation.

Figure 3:
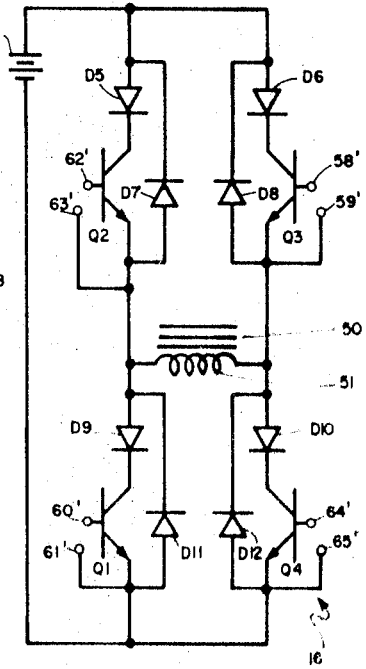
FIG. 3 is a schematic circuit diagram of a bridge circuit to drive the primary of the transformer shown in FIG. 1.

The commutation pulse generator 16 is shown in detail in FIG. 3. The purpose of the generator is to provide a square pulse voltage of alternating polarity to the armature to force commutation of the armature current. Current pulses—which typically may be 35 μs long and adjustable in proper circumstances—which pass through transistors Q2 and Q4 render terminal A positive with respect to terminal B, and current pulses which pass through transistors Q3 and Q1 render B positive with respect to A. Diodes D7, D8, D11 and D12 provide paths along which current resulting from induced voltage in the primary coil 51 of the transformer core setting to a state of zero excitation flux can pass for resetting the transformer 50. The reset pulse magnitude is limited to a voltage two diode drops greater than the input voltage from the battery source 12' to the commutation bridge 16. Diodes D5, D6, D9 and D10 serve to prevent the circuit shown in FIG. 3 from oscillating due to coaction between charge storage effects in the transistors Q1–Q4 and the winding 51.

Figure 5:
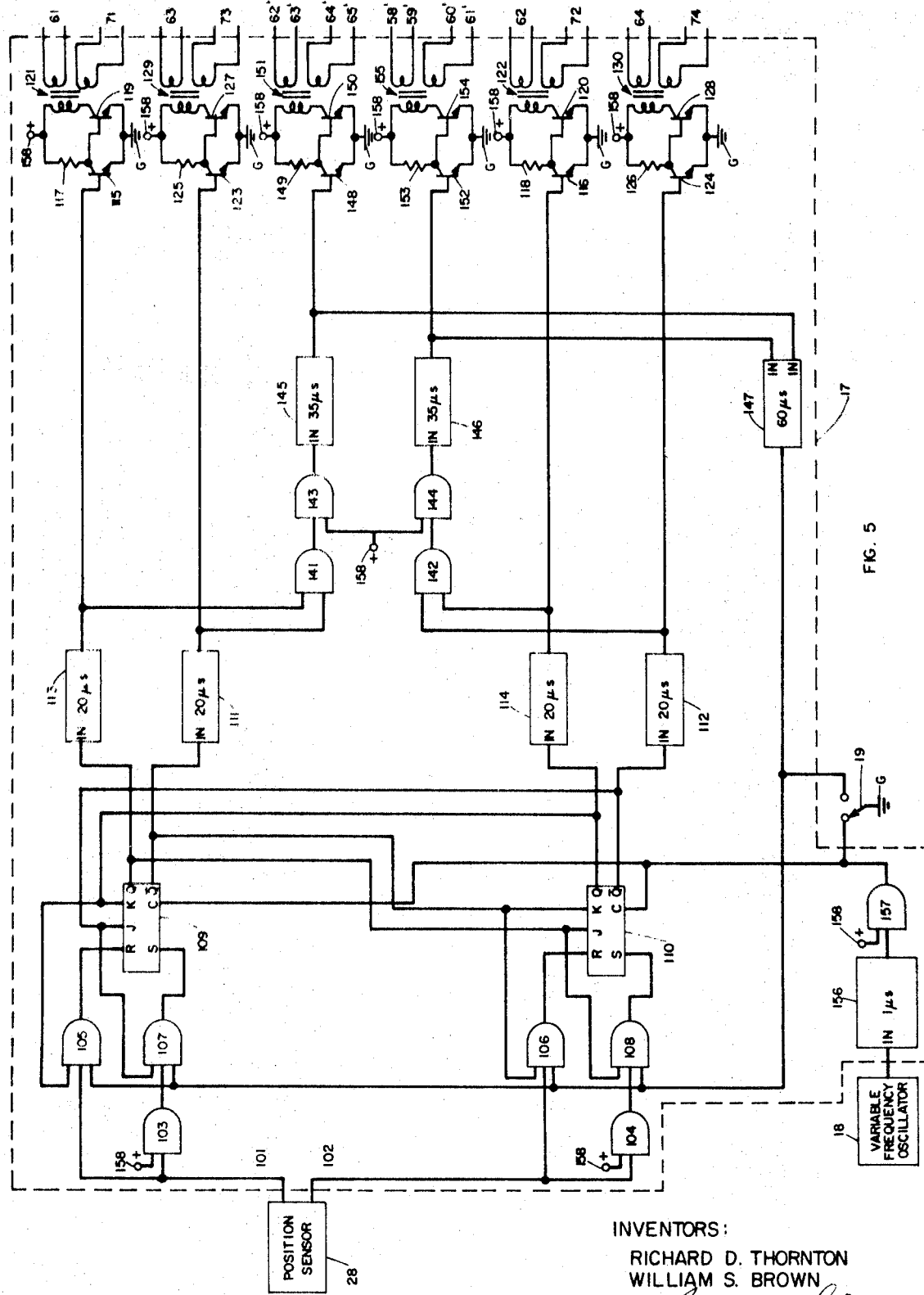
FIG. 5 is a schematic circuit diagram showing the elements within the block labeled "CONTROL" in FIG.1.

The control 17 is shown in detail within the dotted enclosure in FIG. 5, the logic elements shown being in this case diode transistor logic (DTL). The control 17 shown is for use in connection with the four coil armature motor of FIG. 1. There are two inputs numbered 101 and 102 to the control 17 from the position sensor which is marked 28 in FIG. 5, the input 101 being connected to NAND-gates 103 and 105 and the input 102 being connected to NAND-gates 104 and 106. The outputs of the gates 103 and 104, which are connected to act as logic inverters, are connected to an input of NAND-gates 107 and 108, respectively. Each of the gates 105, 106, 107 and 108 have one input derived from a filtering monostable 147. The third input to gates 105 to 108 comes respectively from the output Q of a flip-flop 110, the Q̄ output of the flip-flop 109, the Q̄ output of the flip-flop 110 and the Q output of the flip-flop 109. The outputs of gates 105 to 108 go respectively to the R inputs of the flip-flops 109 and 110 and the S inputs of the flip-flops 109 and 110. The input from the variable frequency oscillator 18 is connected to the input of a monostable 156, the output of which is connected to a NAND-gate 157 which is connected to act as a logic inverter. The output of the gate 157 is connected to the clock inputs C of the flip-flops 109 and 110. The switch 19, which connects either the output of the gate 157 or the output of the monostable 147 to ground, determines whether the inputs to flip-flops 109 and 110 shall originate with the position sensor 28 or the oscillator 18. The J and K inputs to the flip-flop 109 are respectively the Q̄ and Q outputs of the flip-flop 110; the J and K inputs to the flip-flop 110 are respectively Q and Q̄ outputs of the flip-flop 109; the Q and Q̄ outputs of the flip-flop 109 are connected respectively to monostables 113 and 111; and the outputs Q and Q̄ of the flip-flop 110 are connected respectively to monostables 114 and 112. The monostables 111 to 114 time the gate pulse to SCR's S1 to S8 of FIG. 1. The inputs to a NAND-gate 141 are derived from the monostables 111 and 113. The inputs to a NAND-gate 142 are derived from the monostables 112 and 114. The outputs of the NAND-gates 141 and 142 are connected respectively to the inputs of NAND-gates 143 and 144 which are connected respectively to the inputs of NAND-gates 143 and 144 which are connected to act as logic inverters. The outputs of the gates 143 and 144 are connected respectively to the inputs of monostables 145 and 146 which time the base drive for the transistors Q1, Q2, Q3, and Q4 in FIG. 3. The outputs of the monostables 145 and 146 are also connected to the inputs of the monostable 147. The monostable 147 prevents the flip-flops 109 and 110 from changing state for a fixed time length (after commutation has begun), 60 microseconds for the example shown in FIG. 5, when the inputs to the flip-flops 10 and 110 are being derived from the position sensor 28 which may give noisy signals during commutation. The outputs of the monostables 113, 111, 114, 112, 145 and 146 are connected to the bases of the transistors 115, 123, 116, 124, 148 and 152, respectively, the collectors of which are connected to the + terminals designated 158 of the source 13 through resistances 117, 125, 118, 126, 149 and 153, respectively, and to the bases of transistors 119, 127, 120, 128, 150 and 154, respectively. The emitters of transistors 115, 119, 123, 127, 116, 120, 124, 128, 148, 150, 152 and 154 are connected to a common ground G.

The primary winding of transformers 121, 129, 122, 130, 151 and 155 are connected between the + terminal 158 and the collectors of transistors 119, 127, 120, 128, 150 and 154, respectively. The outputs of transformers 121, 129, 122 and 130 are fed along conductor pairs 61 and 71, 63 and 73, 62 and 72 and 64 and 74, respectively, to SCR's S1 to S8 in FIG. 1. The outputs of transformers 151 and 155 are fed along conductors 58' to 65' to transistors Q1, Q2, 23, and Q4 in FIG. 3.

Two flip-flops only are shown in FIG. 5 since the control 17 is employed in connection with the four coil embodiment of FIG. 1, as mentioned. When twelve coil apparatus, as shown in FIG. 2 is used, six flip-flops similar to the flip-flops 109 and 110 are employed. Assuming the flip-flop 109 to be the fist of the six, then the Q and Q̄ outputs are fed respectively to J and K terminals of the next successive flip-flop and to other elements, as shown in FIG. 5, and the second flip-flop is similarly connected to the third, etc. The Q and Q̄ outputs of sixth flip-flop are fed as inputs to K and J, respectively, of the first flip-flop. Each flip-flop eventually controls four SCR's in the manner that the flip-flops 109 and 110 control SCR's S1 to S8 as before explained. It should be noted that outputs (as 61, 71, etc.) of the control 17 that are fed to the gate and cathode electrodes of the SCR's will increase in number as the number of armature coils and flip-flops in the control 17 are increased, but the number of outputs from the control 17 to the transistors Q1 to Q4 in FIG. 3 do not increase. Also, in connection with the circuit of FIG. 2, if the leads 61 were connected between the gate and cathode of, say, the SCR S10, then the leads 63 would be connected between the gate and cathode of the SCR S16, the leads 71 would be connected between the gate and cathode of the SCR S16', and the leads 73 would be connected between the gate and cathode of the SCR S10'.

Figure 4:
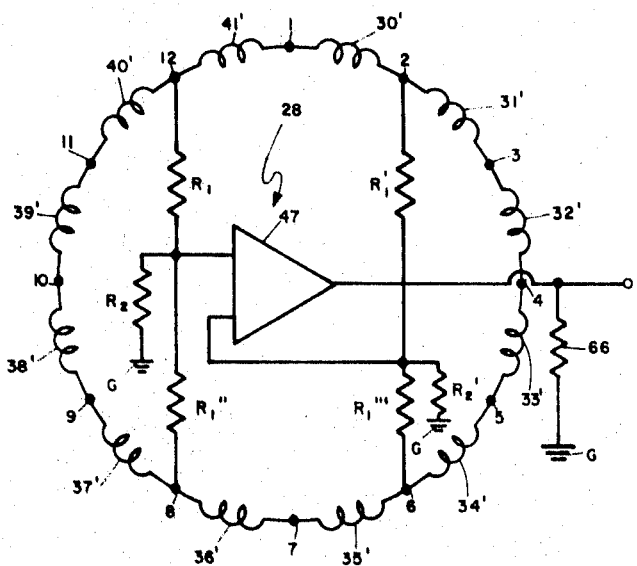
FIG. 4 is a schematic circuit diagram of a position sensing circuit adapted to provide commutation-timing signals.

Position sensing refers, generally, to the running mode process of deciding when to commutate. If the position sensing means shown in FIG. 4 is used, in the running mode commutation of a coil begins approximately 15 electrical degrees before its open circuit voltage has a zero crossing. In other words, the current and voltage of each phase change direction at almost the same time. Thus, power flow into each armature coil is nearly always positive, which results in a torque angle very close to 90°. Using open circuit voltages for position sensing in this way is ideal from the standpoint of obtaining maximum torque from a given motor current. Position sensing in the apparatus disclosed herein is accomplished by means of six circuits such as the circuit shown in FIG. 4. The circuit shown indicates when armature coils 30' and 36' should be commutated, and the other five position-sensing circuits (not show) signal the beginning of commutation for the other five pairs of oppositely disposed armature coils.

The operation of the position-sensing circuit in FIG. 4 can be summarized by saying that the output of the differential comparator shown at 47 changes state almost instantly whenever the open circuit voltage of the coils 30' and 36' becomes equal in magnitude and opposite in polarity to the open circuit voltage of the respective coils 41' and 35'. To accomplish this, two inputs to the comparator 47 are provided by a resistance bridge network comprising equal-value resistances $R_1$, $R'_1$, $R''_1$, and $R'''_1$, the inputs being derived from the common connections between $R_1-R_1''$ and $R'_1-R'''_1$. Resistances $R_2$ and $R'_2$ appear between said common connections and ground G. A resistance 66 attached between the output and ground G improves the fan out of the differential comparator when used with DTL current sinking logic. Because of the phase relations of the armature coils described previously, if the open circuit voltages were sinusoidal, the output would change state 15 electrical degrees before the open circuit voltage of the coil 30 changed polarity. Whenever the open circuit voltages of the coils 30' and 41' are equal and opposite, the coils 36' and 35' have the same relationship. Because induced voltage is proportional to speed, this means of position sensing cannot operate at arbitrarily low motor speeds and therefore is not normally suitable for starting the motor.

Figure 6:
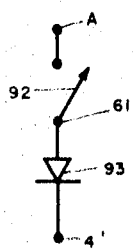
FIG. 6 is a schematic diagram of a portion of the circuit of FIG. 1 to illustrate alternate circuit elements useable therein.

The SCR's S1 to S8 in FIG. 1 can each be replaced by the switch and diode arrangement shown schematically in FIG. 6 where a switch 92 in series with a diode 93 are shown connected between an A terminal and the node 4'. Each SCR can be replaced by such an arrangement. The switch 92 can be controlled by signals from the control 17 along conductors 61 or it can be part of a mechanical commutator mounted on the shaft of the motor being controlled or on the shaft of a separate motor.

The SCR's S1, S2, etc. shown can be replaced by thyratrons, ignitrons, transistors and other controlled semiconductor devices with appropriate circuitry changes. The example in the drawings illustrates a motor having its field in the rotor and a stationary armature, but, of course, the two can be reversed, and, in fact, both armature and field can be made to rotate. The variable frequency oscillator and commutating pulse generator can be powered by separate voltage sources 12' and 14, as shown, or they can be powered by the voltage source 43, as can, also, the control 17. The variable resistance 45 can be replaced by a chopper or other type of electronic or electro-mechanical speed control apparatus. Further modifications of the invention will occur to persons skilled in the art.

What is claimed is:

1. An electronic motor that comprises, in combination, an armature winding having an even number of coils connected in a closed-loop configuration, an even number of switching devices connected to conduct electric current between a power source and the nodes of the armature winding, a field electromagnetically coupled to the armature, magnetic coupling means electrically connected serially through said switching devices to said coils to introduce commutation voltages through said electrical connection to the coils in the armature winding, the magnitude of commutation voltages thereby introduced being independent of motor speed, and means for initiating commutation of each coil of the winding.

2. An electronic motor as claimed in claim 1 in which the switching devices are diodes used in conjunction with a mechanical commutator.

3. An electronic motor as claimed in claim 1 in which the switching devices are semiconductor controlled rectifier switches which are activated by signals derived from a position sensor for detecting relative orientation between the magnetic fluxes of the field and the armature.

4. Apparatus as claimed in claim 1 in which the position sensor comprises a circuit including a differential comparator connected to change state when the voltage of the coil to-be-commutated is equal to the instantaneous value of a reference signal.

5. Apparatus as claimed in claim 4 in which the differential comparator is connected to receive said reference signal from the coil commutated immediately preceding said coil to-be-commutated.

6. Apparatus as claimed in claim 1 having starting means which includes: means for rendering the position sensor ineffective, a variable frequency AC source connected to initate commutations in lieu of the ineffective position sensor, and means for rendering the position sensor effective to initiate said commutations and the variable frequency source ineffective for such purpose.

7. An electronic motor as claimed in claim 1 in which the field excitation is produced by induction action from the armature.

8. An electronic motor that comprises, in combination, an armature winding having an even number of coils connected in a closed-loop configuration, an even number of switching devices connected to conduct electric current between a power source and the armature winding, a field electromagnetically coupled to the armature, position sensor means for detecting relative orientation between the magnetic fluxes of the field and the armature, a transformer serially connected through the switching devices to introduce commutation voltages through said switching devices to the coils of the armature winding, the position sensor means being connected to initiate commutation of each winding, and a plurality of diodes connected between the transformer and the power source.

9. In an electronic motor an armature having an armature winding that contains an even number of coils connected in a closed-loop configuration, an even number of switching devices connected to conduct electric current between a power source and nodes of the armature winding, a field electromagnetically coupled to the armature, transformer means directly electrically connected to introduce commutation voltages serially through said switching devices to the coils of the armature winding, and means for initiating commutation of each coil.

10. An electronic motor as claimed in claim 9, in which the switching devices are SCR's and in which the means for initiating commutation includes a position sensor, said position sensor being adapted in the running mode commutation of each coil of said armature winding to initiate such commutation.

11. An electronic motor as claimed in claim 9, in which the means for initiating commutation includes a variable frequency oscillator to initiate commutation.

12. An electronic motor as claimed in claim 9 which includes a commutation pulse generator connected to the transformer means, which commutation pulse generator generates a square pulse voltage of alternating polarity to force commutation of armature current.

13. An electronic motor as claimed in claim 12 in which the transformer means comprises a transformer having a primary and two secondaries, the pulse generator being connected across the primary and the secondaries being connected to coils 180 electrical degrees apart in said armature winding, said square pulse voltage introduced to the primary appearing as an output voltage from said secondaries, each secondary being connected to introduce a voltage to the associated coil which opposes the voltage in said associated coil during commutation and reduces current flow in said associated coil to zero in the course of such commutation.

14. An electronic motor as claimed in claim 13 in which said switching devices are SCR's and which includes control means applied across the gate and cathode of each SCR, the control means being adapted to bias a particular SCR ON, said particular SCR being turned OFF when the opposing voltage from the transformer tries to make the current flow backward in said particular SCR, said control means being adapted simultaneously to turn another SCR ON, thereby causing the current in the said associated coil to reverse direction.

15. An electronic motor as claimed in claim 13 in which a plurality of diodes is connected across the primary of the transformer to provide a short circuiting path for current inducted in said primary to allow the transformer to reset.

16. An electronic motor as claimed in claim 15 which includes a plurality of diodes connected in the output circuit of the secondaries of the transformer to isolate electrical connections between the secondaries and one associated SCR from the connections between the secondaries and another associated SCR.

* * * * *